Feb. 4, 1941.     Z. J. ATLEE     2,230,858

BEARING

Filed July 13, 1939

INVENTOR.
Zed J. Atlee
BY Cox & Moore
ATTORNEYS

Patented Feb. 4, 1941

2,230,858

UNITED STATES PATENT OFFICE 2,230,858

BEARING

Zed J. Atlee, Elmhurst, Ill., assignor to General Electric X-Ray Corporation, Chicago, Ill., a corporation of New York Application July 13, 1939, Serial No. 284,272

13 Claims. (Cl. 250—148)

My invention relates in general to anti-friction devices and has more particular reference to bearing construction.

An important object of the present invention is to provide a bearing construction for rotating means in which it is desirable to prevent the escape, from the bearing, of bearing material produced by the wearing of the bearing in service.

Another important object is to provide a bearing construction particularly well adapted for use in supporting rotating elements in evacuated or low pressure chambers, as, for example, in the evacuated envelope of an X-ray generator, including means for preventing the dissipation of wear products from the bearing within the envelope.

Another important object is to provide a roller bearing construction adapted to afford trouble-free service, as in the envelope of an X-ray generator, over an extended service life, under extreme temperature conditions, without lubrication and without impairing the operation of the generator through dissipation of wear products within the envelope.

Another important object is to provide an improved bearing incorporating a magnetic element for the purpose of attracting, catching, and retaining any wear products thrown off by the bearing during service, and to retain the same and prevent dissipation thereof away from the bearing.

Another important object resides in providing a rotating anode structure including a bearing for use in X-ray generators; a still further object being to provide a bearing of the roller type including yielding means to permit the bearing to operate without binding or undue wear within an extended range of operating temperature; a still further object being to utilize a yielding split roller race structure to maintain precise bearing alinement at all times regardless of temperature conditions and bearing wear.

These and numerous other important objects, advantages, and inherent functions of the invention will become apparent as the same is more fully understood from the following description, which, taken in connection with the accompanying drawings, discloses a preferred embodiment of the invention.

Referring to the drawing.

Figure 1:
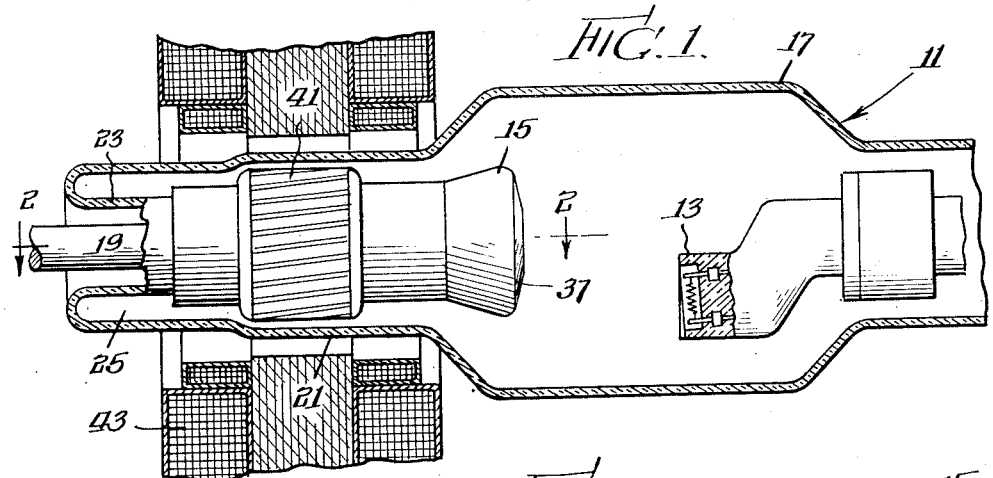
Figure 1 is a sectional view taken through an X-ray generator provided with a rotating anode supported by a bearing structure embodying my present invention.

To illustrate my invention I have shown on the drawing an X-ray generator 11 comprising spaced-apart cathode and anode means 13 and 15 enclosed within a preferably glass envelope 17.

The anode 15 is of the rotating type, being supported for rotation on a spindle 19, which in turn is mounted on the envelope 17 at one end thereof. As shown, the envelope 17 has an extension 21 within which the anode 15 is snugly disposed for rotation, the envelope having a reentrant sleeve-like portion 23 forming an annular space 25 between the envelope extension 21 and the reentrant portion 23.

The spindle 19 has an outwardly extending portion which is provided with means 29 forming an annular shoulder carrying sealed thereon an annular flanged member 31. The member 31 has a peripheral edge sealed with the inner end of the reentrant envelope portion 23 to form a glass-to-metal seal 33 between the envelope and spindle. This seal 33 supports the spindle on the envelope with a portion 35 of the spindle extending within the envelope, the anode 15 being journalled for rotation on said inwardly extending spindle portion 35.

It should be understood that X-ray generators function to produce X-rays in response to the activation of the anode by electronic action established by the operation of the cathode 13. This electronic action comprises the impingement of electrons emitted by the cathode upon a target 37 forming a part of the anode. Electronic impingement on the target results in the generation of relatively large quantities of heat at the target, which is dissipated thence through the body of the anode 15. When in operation, the temperature of the X-ray generator and particularly of the anode may be of the order of upwards of 500° C.

In conditioning an X-ray generator for operation it is necessary to exhaust, from the envelope 17, substantially all gaseous and other impurities, the same being accomplished by evacuating the envelope as by means of a molecular exhaust pump while heating the elements of the generator to a high temperature in order to drive out gases occluded in the envelope and all other elements therein. The envelope finally is sealed after substantially all impurities have thus been eliminated.

During the operation of the X-ray generator as such it is necessary that the anode 15 be rotated at high speed in order to minimize the danger of over-heating and burning the target itself at the point of electron impact. Considerable difficulty has been encountered in providing suitable means for supporting the anode for rotation in X-ray generators. Ordinary bearing constructions are not well adapted to maintain the anode in precise alinement substantially without vibration throughout extended service periods. Since it has not as yet been found possible to lubricate the bearing, since usual lubricants will become dissipated from the bearing within the envelope 17 and thus impair the operation of the X-ray generator as such, bearings of ordinary construction wear so rapidly in service at the high operating temperatures to which they are exposed as to be virtually useless.

Wearing of the bearing results in the production of free bearing material as a wear product in substantially dust-like condition, and the production of such wear products impairs the operation of the X-ray generator as such by becoming dissipated within the envelope and thus vaporized by the heat and electronic action.

My present invention provides for retaining wear products within the bearing, thus preventing the same from being dissipated within the envelope to zones where the presence of such wear products would impair the operation of the generator. This phase of the invention, of course, has great value in any bearing where the dissipation of wear products is undesirable, and my invention therefore contemplates the application of means for preventing dissipation of wear products in any bearing.

My invention, however, also contemplates the utilization of means for preventing the dissipation of wear products in combination with a yielding bearing construction by virtue of the yielding nature of which bearing wear is reduced to a minimum without, however, impairing accurate alinement of the bearing under all operating conditions.

As shown in the drawing, the anode 15 comprises a cylindrical body having an open end extending in the annular space 25 in position to encircle the seal 33 at the inner end of the reentrant envelope portion 23, thus forming a shield for protecting the seal 33 from deterioration through impingement of stray electrons thereon. The opposite end of the anode body is closed, as at 39, and affords a mounting for the target 37. Externally the cylindrical walls of the anode form a seat on which is secured the rotor 41 of an electric motor, the stator 43 of which encircles the envelope extension 21 in cooperative relationship with the rotor 41 whereby to drive the anode within the envelope when the stator 43 is excited from any suitable source of electrical power externally of the envelope.

The spindle 35 thus extends within the cylindrical anode and carries bearing means 45 embodying my present invention, said bearing means comprising in the illustrated embodiment a pair of roller bearings 44 and 46, each comprising an outer race 47 secured on the anode and an inner race secured on the spindle 35, roller members 55 of any suitable or convenient form, and illustrated as balls, being retained between the inner and outer races.

Upon the spindle 35, between the bearings 44 and 46, I mount a magnet M, comprising in the illustrated embodiment a sleeve-like member of magnetic material such as Alnico, which will hold its magnetism at high temperatures. Any suitable magnetic material, however, may be employed, and of course the arrangement of the magnet M as an electromagnet is also within the contemplation of my present invention. The magnet extends on the spindle 35 between the facing ends of the bearings 44 and 46, the spindle 35 carrying magnetic shields S at the opposite ends of the magnetic sleeve. These shields preferably comprise washers of copper or other suitable non-magnetic material to prevent the magnetization of the balls and races.

The anode 15 may, of course, be mounted on the bearing elements 47 in any suitable or preferred fashion, although I prefer to form the anode 15 internally with a seat 81, in which is secured, as by the fastening members 83, a cylindrical sleeve-like mounting element 85, on which the bearing members 47 are mounted and clamped in any suitable or convenient fashion, as by means of the clamps 87 and 89.

The heat generated in the anode has a maximum value at the target end, the heat being dissipated thence partly into the space enclosed within the envelope and partly by conduction through the body of the anode and the bearing mount 85, thence through the bearings and the spindle to the outwardly extending end thereof. The bearing 46 at the end of the spindle portion 35, being disposed adjacent the target end of the anode, tends to operate at a relatively higher temperature than that to which the anode remote bearing 44 is exposed. In order to equalize the operating temperatures of the bearings as much as possible so that one will not deteriorate more rapidly than the other, I arrange the anode and bearing structure to protect the bearing 46. This may be accomplished by providing a heat shield 91 at the inner end of the spindle 35 in position enclosing the bearing 46. The shield 91 preferably comprises a cup-shaped plate of highly polished material such as molybdenum or tantalum, which will not oxidize. The bottom of the cup-shaped heat shield may be attached conveniently on the end of the spindle 35, as by means of fastening screws 93 extending through the bottom of the shield and taking into the nut 69 on the end of the spindle, the annular walls of the shield extending outwardly of and embracing the bearing 46.

The highly polished surfaces of the shield 91 reflect and thus tend to prevent radiant heat from passing between the target end of the anode and the bearing. The inner surfaces of the shield may be treated to prevent heat radiation from the shield inwardly toward the bearing.

In addition, the bearing support frame 85 is secured on the anode in position defined by the seat 81 whereby the heat transfer path between the cylindrical walls of the envelope and the bearing 44 is appreciably shorter than the heat transfer path between said walls and the bearing 46, so that the bearing 44 will be made to carry a greater proportion of conducted heat than the bearing 46.

Figure 2:
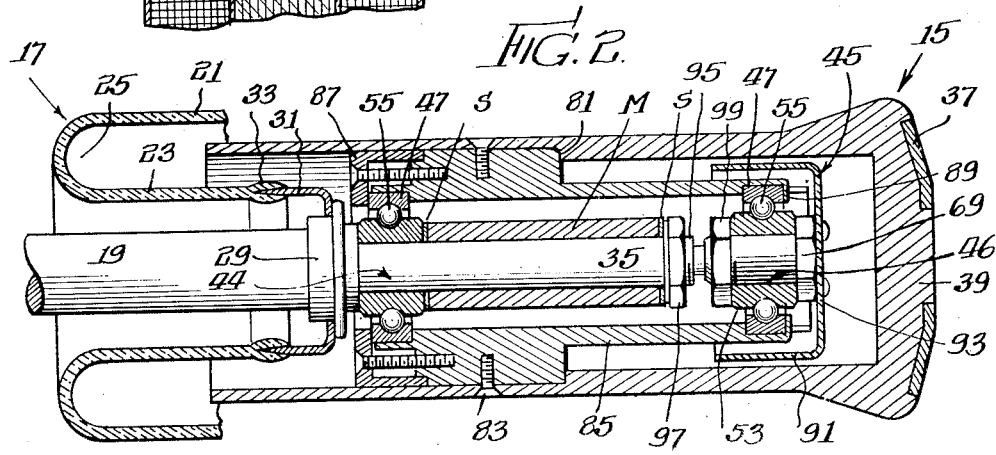
Figure 2 is an enlarged sectional view taken substantially along the line 2—2 in Figure 1, illustrating an embodiment of my present invention.

As shown in Figure 2 of the drawing, the spindle 35 has a threaded portion 95 adjacent the bearing 46, and the inner race member 51 of the bearing 44, together with the magnet M and the shield washers S, are secured on the spindle by means of a holding nut 97 threaded on the spindle portion 95 in position to clamp the parts thereon. The bearing 46 likewise is secured on the spindle by and between a clamping nut 99 threaded on the spindle adjacent the nut 97, and the clamping nut 69 at the end of the spindle.

Figure 3:
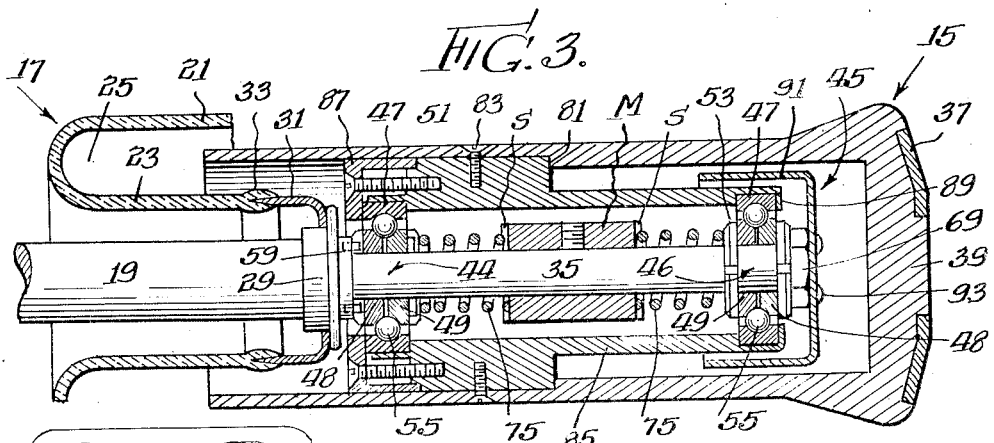
Figure 3 is a similar sectional view taken substantially along the line 2—2 in Figure 1 to show a modified arrangement of the bearing.
Figure 4:
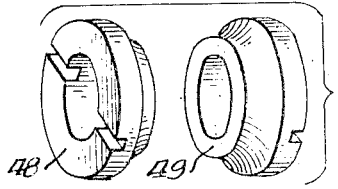
Figure 4 is a perspective view of parts of the bearing.

As shown in Figure 3 of the drawing, the inner race members 51 and 53 of the bearings 44 and 46 each comprise a pair of cooperating elements 48 and 49. The elements 48 and 49 are preferably of identical construction, comprising each an annular member or collar adapted to fit upon the shaft 35, each element having a trackway on one end and diametral slots at the other. The elements 48 and 49 are assembled on the shaft 35 with the track-forming portions in facing cooperative relationship whereby both portions form a way for the roller members 55, which are thus held between the parts 48 and 49 and the outer raceway.

The bearing 44 is assembled on the stem 35 adjacent the seal 33, the shaft being provided with a shouldered abutment 59, and said abutment carrying pins adapted to engage in the slots 53 to lock the element 48 against turning movement on the spindle. The cooperating member 49 also is locked against turning movement on the shaft by means of a diametral pin mounted on the shaft in position to extend in the diametral slots 53 of said race element 49. The cooperating race elements 48 and 49 are thus fastened on the shaft for limited separational movement thereon.

The other bearing 46 is mounted on the spindle at the end of the stem 35, the race element 48 of said bearing abutting against the nut 69 threaded on the end of the spindle, said nut carrying pins extending into the slots 53 of the race element to hold the same from turning on the spindle. The cooperating race element 49 of the bearing 46 is also held from turning on the shaft by means of a diametral pin whereby the race elements 48 and 49 are anchored on the stem for limited separational movement.

The cooperating race elements 48 and 49 of each bearing are normally urged together by preferably helical spring means 75 encircling the spindle between the bearings. The spring means preferably comprises spring sections, each seated at one end on the washers S, at the opposite ends of the magnet sleeve M, the other ends of the spring sections pressing upon the race sections 49 of both races to urge the same yieldingly toward the cooperating race sections 48. I have found that this construction affords adequate support for anodes rotating at high speeds, that the bearing structure is adapted to support the rotating anode in accurate alinement substantially without vibration regardless of the range of temperature to which the parts are exposed, that the bearing structure will continue to operate substantially without vibration even after excessive wear of the rollers 55. At the same time, the magnetic means M, whether employed with nonyielding bearings of the type shown in Figure 2 or with the yielding bearing arrangement shown in Figure 3, will effectively attract and retain all bearing dust and wear products thrown off by the working parts of the bearing during its service life and thereby prevent the escape of the wear products out of the anode and into the region within the envelope 17 where presence of such wear products will impair the operation of the generator.

It is thought that the invention and its numerous attendant advantages will be fully understood from the foregoing description, and it is obvious that numerous changes may be made in the form, construction, and arrangement of the several parts without departing from the spirit and scope of the invention, nor sacrificing its attendant advantages, the forms herein disclosed being merely for the purpose of demonstrating the invention.

The invention is hereby claimed as follows:

1. An X-ray generator comprising a sealed envelope, a support spindle extending in said envelope, an anode member and bearing means to rotatably support the anode member on the spindle, and magnetic means adjacent said bearing means in position to attract and retain wear products of said bearing means.

2. An X-ray generator comprising a sealed envelope, a support spindle extending in said envelope, an anode member comprising cylindrical walls enclosing said spindle, bearing means on said spindle and carrying said anode rotatably thereon, and magnetic means supported within said hollow anode in position with respect to the bearing means to attract and retain wear products thereof and prevent the dissipation of said wear products outwardly of the hollow anode within said envelope.

3. An X-ray generator comprising a sealed envelope, a support spindle extending in said envelope, a hollow anode member having walls enclosing said spindle, spaced-apart roller bearings on said spindle and connected with said anode to rotatably support the same on the spindle, and magnetic means comprising a sleeve-like element of magnetic material between said spaced bearings in position to attract wear products of both bearings and retain said wear products within said hollow anode.

4. An X-ray generator comprising a sealed envelope, a support spindle extending in said envelope, an anode member and bearing means to rotatably support the anode member on the spindle, said bearing means comprising co-operating elements forming a roller trackway, resilient support means cooperatively associated with said elements to normally urge the same into position forming a trackway having a predetermined operating dimension, said support means being of yielding character to allow the dimension of the trackway to change whereby to accommodate for the expansion of bearing parts when heated, and magnetic means operatively associated with said bearing adjacent said trackway in position to attract and retain wear products produced as a result of the operation of said bearing.

5. An X-ray generator comprising a sealed envelope, a support spindle extending in said envelope, an anode member and bearing means to rotatably support the anode member on the spindle, said bearing means comprising a pair of co-operating relatively movable elements forming a roller trackway therebetween, at least one of said relatively movable elements being mounted on the spindle, and magnetic means comprising a sleeve of magnetic material on said spindle in alignment with said spindle mounted element and in position to attract, collect, and retain wear products resulting from the operation of the bearing.

6. An X-ray generator comprising a sealed envelope, a support spindle extending in said envelope, an anode member and bearing means to rotatably support the anode member on the spindle, said bearing means comprising a pair of spaced-apart roller bearings on said spindle, and magnetic means disposed on said spindle between said spaced bearings in position to collect and retain wear products of said bearings, said magnetic means comprising a sleeve of magnetic material encircling and secured upon said spindle between said bearings.

7. An X-ray generator comprising a sealed envelope, a support spindle extending in said envelope, an anode member and bearing means to rotatably support the anode member on the spindle, said bearing means comprising a pair of cooperating relatively movable elements forming a roller trackway therebetween, magnetic means adjacent said trackway in position to attract, collect, and retain wear products resulting from the operation of the bearing, and magnetic shield means interposed between said magnetic means and said movable elements to prevent the latter from becoming magnetized.

8. An X-ray generator comprising a sealed envelope, a support spindle extending in said enevelope, an anode member and bearing means to rotatably support the anode member on the spindle, said bearing means comprising a pair of cooperating relatively movable elements forming a roller trackway therebetween, and magnetic means adjacent said trackway in position to attract, collect, and retain wear products resulting from the operation of the bearing.

9. An X-ray generator comprising a sealed envelope, a support spindle extending in said envelope, an anode member and bearing means to rotatably support the anode member on the spindle, said bearing means comprising a pair of spaced-apart bearings on said spindle, and magnetic means disposed on said spindle between said bearings in position to collect and retain wear products thereof.

10. An X-ray generator comprising a sealed envelope, a support spindle extending in said envelope, an anode member and bearing means to rotatably support the anode member on the spindle, said bearing means comprising relatively movable parts, and magnetic means in position with respect to said parts to collect and retain wear products thereof on said magnetic means.

11. An X-ray generator as set forth in claim 10 wherein said bearing means comprises a pair of cooperating members forming a roller trackway in which the cooperating members are relatively movable in the direction of the axis of the spindle, roller bearing elements in said trackway and support means normally urging said cooperating members into position snugly pressing upon said roller bearing members, said support means being of yielding character to allow the dimension of the roller trackway to change in order to accommodate the roller bearing elements when worn and when expanded under the influence of heat.

12. An X-ray generator as set forth in claim 10 wherein said bearing means comprises a pair of cooperating members forming a roller trackway in which the cooperating members are relatively movable in the direction of the axis of the spindle, roller bearing elements in said trackway and support means normally urging said cooperating members into position snugly pressing upon said roller bearing members, said support means comprising material characterized by the ability to retain its resilient character at temperature of the order of 500° centigrade.

13. An X-ray generator as set forth in claim 10 wherein said bearing means comprises a pair of cooperating members forming a roller trackway in which the cooperating members are relatively movable in the direction of the axis of the spindle, roller bearing elements in said trackway and support means normally urging said cooperating members into position snugly pressing upon said roller bearing members, said support means comprising a helical spring in compression and serving to permit the dimension of the roller trackway to change and thus freely accommodate the roller bearing elements when worn and when expanded by heat.

ZED J. ATLEE.